Oct. 31, 1939.　　F. T. FARMER ET AL　　2,177,628
LAWN MOWER
Filed Oct. 1, 1937　　2 Sheets-Sheet 1

Inventor:
Frank T. Farmer
Stanley D. Loud
By Geo. D. Kennedy Jr.
Attorney

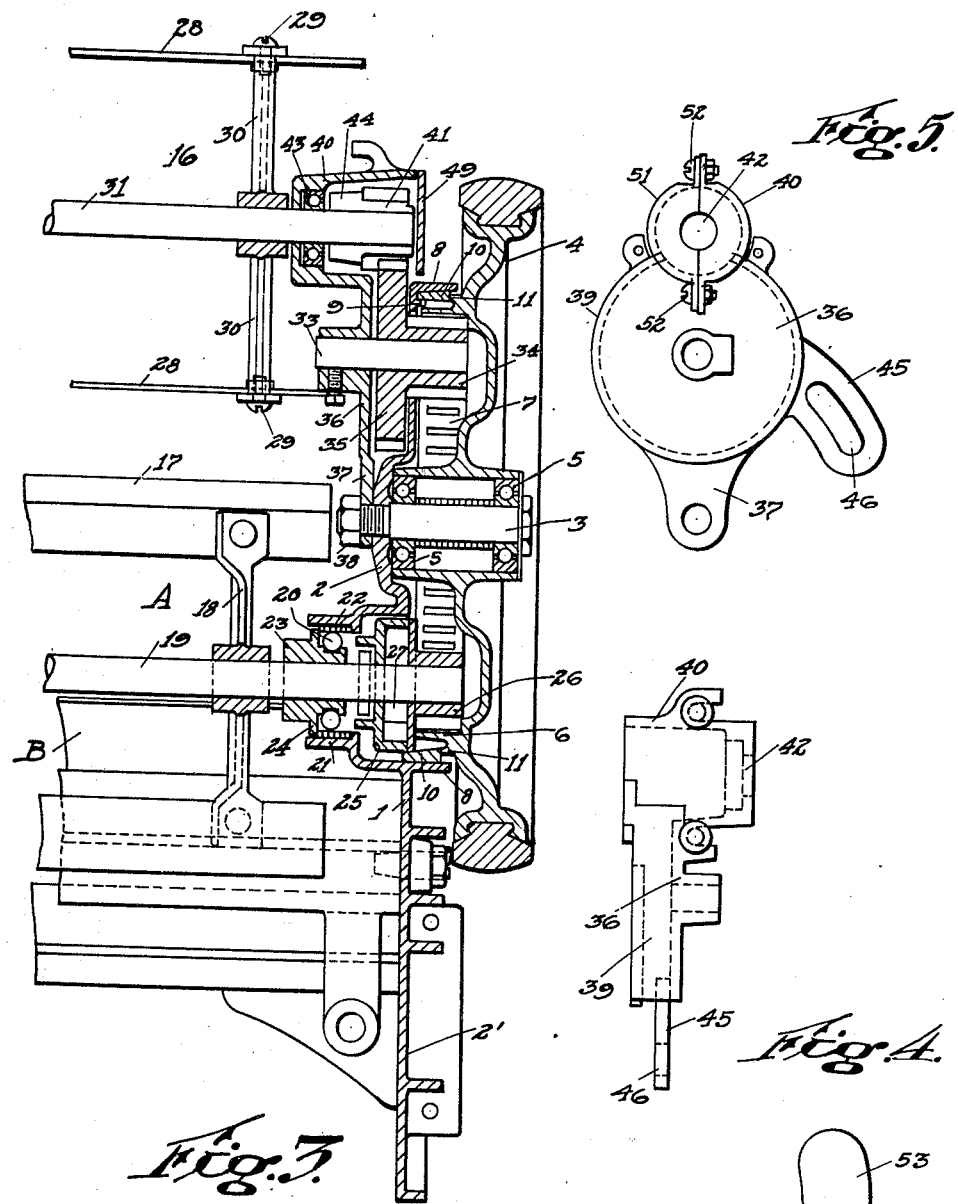

Patented Oct. 31, 1939

2,177,628

UNITED STATES PATENT OFFICE 2,177,628

LAWN MOWER

Frank T. Farmer and Stanley D. Loud, Worcester, Mass., assignors to Worcester Lawn Mower Company, Worcester, Mass., a corporation of Massachusetts Application October 1, 1937, Serial No. 166,847

3 Claims. (Cl. 56—238)

The present invention relates to lawn mowers. The principal object of the invention is to provide a lawn mower which can cut satisfactorily not only the cultivated fine grass of a lawn, but also the various tough stems or stalks (of dandelion, buckthorn, and other weeds) which are invariably left standing after a lawn has been cut with an ordinary mower.

Our invention resides, as hereinafter described, in certain novel combinations and arrangements of parts whereby the grass-shearing action of the conventional cutter bar and rotary reel assembly of the ordinary mower is supplemented, when needed, by the scything action of another rotary cutting device, the latter being positioned forwardly of the shear-cut mechanism and obtaining the severance or beheading of all refractory stems and high-growing grasses in advance of the passage thereover of said shear-cut mechanism, which is thus enabled to mow everything growing on the lawn to a uniform height. Other and further objects and advantages of the invention will be made apparent in the following detailed description thereof, reference being had to the accompanying drawings, in which—

Fig. 3 is an approximately horizontal sectional view through one of the sides of the mower, the section being taken on the line 3—3 of Fig. 1.

Figs. 4 and 5 are side and edge views respectively of an adjustable housing associated with each side plate.

Figs. 6 and 7 are plan views of certain plates employed in my improved mower construction.

Like reference characters refer to like parts in the different figures.

Figures 1, 2:
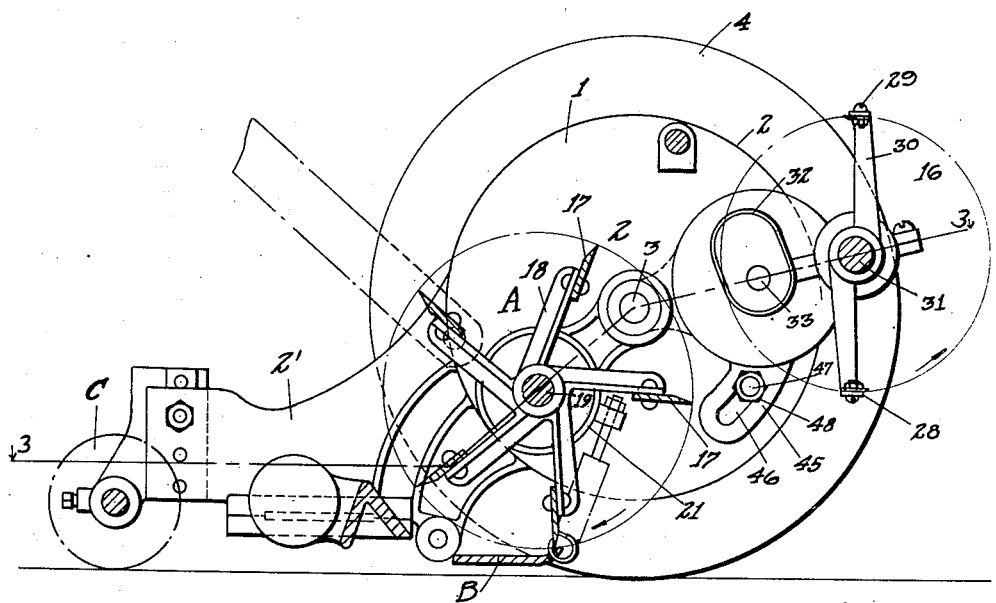
Fig. 1 is a vertical sectional view illustrating the essential elements of my improved lawn mower.
Fig. 2 is a similar sectional view illustrating the driving mechanism for the rotary cutting devices.

Our invention employs the usual grass-shearing mechanism (cutter bar and cooperating rotary reel) of the conventional lawn mower, and combines with said shearing mechanism, preferably in advance thereof, a high speed rotary cutter for operation on those lawn growths which are peculiarly resistant to the shearing action of the usual cutter bar and reel, viz., growths such as dandelion and buckthorn stems and high tough grass which are simply bent over by the conventional mower and spring up again, to detract from the appearance of the lawn, as soon as said mower has passed over them.

In our improved lawn mower, the shear-cut mechanism, consisting of a rotary reel A and ledger bar B, may be of any known construction; as herein shown, merely by way of example, the ledger bar B and follower roll C have substantially the same construction and mounting as that shown and described in Farmer United States Letters Patent No. 1,808,646, June 2, 1931. Our invention is not concerned with the form, mounting or construction of these parts; said invention resides in combining and coordinating with any known shear-cut mechanism (A, B) of a lawn mower, a supplementary rotary cutter for operation on the unshearable growths of a lawn as hereinafter more fully set forth.

The frame of our improved mower which carries the shear-cut mechanism A, B, as well as the supplementary rotary cutter, consists of a pair of spaced opposite side plates 1, 1 (only one of which is shown in Figs. 1 and 3). Each of these duplicate plates 1, 1 of special construction, has a circular portion 2 and a tail portion 2', the two tail portions 2', 2' supporting between them in any desired way the ledger bar B and the adjustable follower roll C. Each circular portion 2 at its center carries an outwardly projecting short stud 3, and on said studs 3, 3 are rotatably mounted the mower's drive or traction wheels 4, 4, here shown as having their hub portions equipped with suitable bearings 5, 5 surrounding the studs 3, 3. From the inner face of each wheel 4 projects a concentric annular flange 6; at least one of said flanges, and preferably both, provides on its inner surface the teeth of an internal gear 7, said internal gear or gears 7 being the driving means that effects the desired rotation of reel A of the shear-cut mechanism of the mower, as well as the rotation of the supplementary cutter for the unshearable growths of a lawn, as hereinafter more particularly described.

Our invention preferably provides for an effective dust-tight inclosure of the internal gear 7 and the mechanism driven thereby, each side plate portion 2 for this purpose having an external annular flange 8 which is concentric with and somewhat greater in diameter than the wheel flange 6. Inwardly of its flange 8, the side plate provides another shorter external flange 9, and in the annular space between the flanges 8 and 9 is snugly received a packing 10 of felt or other suitable material, whose outer edge is abutted by an internal flange 11 on the wheel 4, said flange 11 being outside of the wheel flange 6, but inside of and overhung by the side plate flange 8. Thus the opportunity for any dirt, dust, or pieces of grass to find their way into the inclosure containing the driving mechanism of the mower is reduced to a minimum; the walls of this inclosure, constituted by the wheel 4 and by the side plate portion 2 and its integral flange 8, present at all times, against the ingress of dirt, etc., an effective barrier, unbroken save at the running joint between the edge of flange 8 and the face of the wheel. But this running joint, in addition to being isolated from the mower's cutting mechanism and on the opposite side of the plate 1 therefrom, is also in a substantially vertical plane, and as a consequence, gravity would be effective throughout one-half of the circumferential extent of such joint in getting rid of any dirt, etc., that might collect in the zone of flange 8. But no dirt thus not expelled from the joint can reach the internal gear 7, because of the additional protection afforded by the packing 10 and its cooperating flanges 9 and 11, as above described.

The side plates 1, 1, beyond the radius of flange 8, have the suitable rearward extensions 2′, 2′, which serve for the adjustable support of the stationary cutter bar or ledger blade B of our improved mower. The construction and mounting of this cutter bar, and the construction and mounting of the adjustable follower or roller C that supports the rear end of the mower, form no part of the present invention; we have shown these parts in substantially the form and environment that they have in said Farmer United States Letters Patent No. 1,808,646, June 2, 1931, but it is to be understood that this showing is merely illustrative, and that any other arrangement would suffice for the attainment of the novel and useful results of our invention. The latter, as hereinbefore set forth, is particularly concerned with supplementing the usual shear-cut mechanism (cutter bar B and its cooperating rotary reel A) with a forwardly-positioned rotary scythe-cut device 16 which, as hereinafter described, is constructed and operated so as to act most efficiently on those parts of a lawn that cannot be cut by the reel A, viz., the tough stalks and stems and high-growing grass.

The primary reel A that cooperates with the ledger bar B has the usual set of spiral blades 17, 17, which are secured in any suitable way to arms 18, 18 radiating from the primary reel shaft 19. The latter is journalled in suitable bearings 20 (here shown as ball bearings) which are supported in the alined tubular bosses 21, 21 that project from the inner faces of the two side plates 1, 1. As herein shown, each tubular boss 21 receives in the end of its bore the outer raceway 22 of a ball bearing whose inner raceway is provided by a collar 23 on primary reel shaft 19, said collar having a flange 24 that substantially closes the end of said bore and serves, not only to prevent the entrance of any dirt to the inclosure, but also to prevent the escape of lubricant therefrom. Beyond the bearing 20, in a larger-diameter portion of the circular boss 21, the shaft 19 has secured thereto a member 25 which is arranged to cooperate with a pinion 26 rotatably mounted on the end of shaft 19 and in mesh with the internal gear 7, the member 25 and pinion 26 having between them the usual one way ratchet or ball clutch (designated 27), by means of which the pinion's rotation, on forward propulsion of the mower, is communicated to shaft 19 for driving the primary reel, and by means of which the reverse rotation of said pinion, on backward movement of the mower, is without driving effect on said shaft 19. The above described drive of the primary reel A moves the blades 17, 17 in a clockwise path, Fig. 1, at an appropriate speed to effect their usual rearward wiping or shearing action relative to the forward edge of the ledger or cutter bar B, thereby to shear all ordinary grass encountered by said reel on the forward movement of the mower to a height determined approximately by the distance from the ground level at which the ledger bar is adjusted.

The inability of such conventional shear-cut mechanism (ledger blade B and rotary reel A) to operate on relatively high grass and on the tough wiry stalks or stems of various weeds, or other growths, that frequently appear even in well-kept lawns, has long been recognized, but all previous attempts to meet this situation have resulted in impractical devices, or devices only having a limited range of usefulness, since a cutting mechanism expressly designed for operation on high grass and tough wiry stalks or stems cannot, in the nature of things, obtain a close uniform cut of the relatively fine grass that constitutes the great bulk of the growth in the majority of lawns. Our invention solves this problem, by arranging and combining in one and the same lawn mower that provides the conventional shear-cut mechanism (ledger bar B and reel A) a cooperative rotary forwardly disposed cutter 16, driven from the same gear 7 that drives the reel A and functioning to prepare and condition the high grass and tough wiry stems for the shearing action of said primary reel, by scything them off to a height that permits of their being sheared when subsequently encountered by the reel and cutter bar.

The cutter 16 is here shown as comprising a pair of opposite relatively thin sharp-edged blades 28, 28 which are detachably secured, by means of screws 29 or the like, to suitable spider arms 30, 30 projecting radially from a supporting shaft 31. This cutter structure is adapted to be mounted in a forward or advance position crosswise of the mower frame, and to be rotated counter-clockwise, Fig. 1, at a considerably higher speed than the reel A, in such manner as to cut off cleanly, by the sharp edges of the whirling blades 28, the upper portions of all high-growing grasses and stems in the path of the mower, at or near the level of the low point in the path of said blades. The mounting, rotation and adjustment of the cutter 16 is obtained in the following manner:

The side plate 1, at a point nearly diametrically opposite the circular boss 21, provides a curved slot or opening 32, for the passage of a stub shaft 33, whereon is rotatably mounted a pinion 34 adapted to mesh with internal gear 7, said pinion 34 being preferably integral with a gear 35. The stub shaft 33 is mounted in and projects from a housing member 36 which covers the opening 32 and incloses the gear 35, said housing member having an extension 37 by which it is pivotally mounted on the inner threaded end of the stud 3, at the center of side plate 1; a nut 38, engaging the stud 3, serves to clamp the housing member against the side plate, it being understood that the portion of said housing which incloses the gear 35 has side walls 39, 39 whose edges are pressed into snug engagement with the inner surface of side plate 1, thereby to obtain an oil-tight inclosure of said gear 35.

The housing 36 associated with each side plate 1, 1 provides, beyond its relatively thin central portion that incloses the gear 35, a thicker or deeper hollow portion 40 (see Figs. 4 and 5), this portion adapted to contain a pinion 41 meshing with the gear 35, and mounted on the end of the shaft 31 of the cutter 16. The two alined housing portions 40, 40 have opposed openings 42 for the passage of shaft 31, and provide suitable bearings 43 wherein said shaft is journalled. Preferably, the pinion 41 is loose on shaft 31 and serves to drive said shaft in a counterclockwise direction, Fig. 1, only on the forward propulsion of the mower, the driving means being the usual one way ratchet or ball clutch (designated 44) which, on the rearward propulsion of the mower, does not communicate the rotation of pinion 41 to shaft 31. The gearing 7, 34, 35 and 41 is arranged to obtain the rotation of cutter 16 at a relatively high speed, preferably two or three times the speed of the reel A, and in the opposite direction to the rotation of said reel A; thus the thin sharp-edge blades 28, 28 of cutter 16, moving with high velocity, are enabled, particularly in the lower forward quarter of the circular path of each blade, to sever or behead by a scythe-like cut, all tough wiry stems and high-growing grass in the path of the mower,—the cut-off occurring at a level (at or near the low point of the path of blades 28) that reduces such stems and high grass to a height susceptible of being sheared when said cut-off growths are encountered, immediately thereafter, by the reel A and cutter bar B.

The height of the cut taken by this forwardly-positioned cutter 16 can be readily adjusted to conform to various conditions encountered in the operation of the mower, by reason of the fact that the entire forward cutting mechanism is carried by the two housings 36, 36, both pivotally attached to the studs 3, 3 which provide the axes about which the driving gears 7, 7 revolve. Each housing 36, 36 provides (see Figs. 4 and 5) a lateral extension 45 adapted to lie flat against the surface of the associated side plate 1 and serving as a means to adjust the housing to the desired angular position relative to the center or axis of adjustment afforded by the stud 3. To this end, each extension 45 is provided with an arcuate elongated slot 46 through which passes a stud bolt 47 projecting inwardly from the face of the associated side plate 1. A nut 48 is screwed down on bolt 47 to hold the housing 36 in the desired angular position; when it is desired to raise or lower the cutter 16, the nuts 38 and 48 are slackened off, and the two housings are swung in unison up or down, as the case may be, on their pivotal centers afforded by the studs 3, 3; this motion can take place because, notwithstanding the relative displacement which occurs between the driving gear 7 and the pinion 34, the latter is simply shifted angularly about the axis of said driving gear and therefore merely undergoes a rolling action on said gear. When the desired adjustment has been made and the two housings 36 are in accurate alinement, the nuts 38 and 48 are screwed down hard on their bolts, to restore the tight fit of the edges of housing sides 39, 39 against the side plates 1, 1, thereby to prevent the entrance of dust and dirt to and the escape of lubricant from the interiors of said housings. It is to be noted that the openings 32, 32 of the side plates 1, 1 are of sufficient angular extent to permit the above-described adjusting movements, notwithstanding which said openings are always covered and inclosed by the housings 36, 36 at both the upper and the lower limits of the adjustment. It is also to be noted that although the forward part 40 of each housing 36 projects beyond the associated side plate 1, there is no opportunity given for dust or dirt to enter the inclosure, or for lubricant to escape from the inclosure, since the outside ends of said parts 40, 40 are closed by removable cover plates 49, 49, (see Figs. 3 and 6). These plates close the openings and are of appropriate shape at their inner edges 50, 50 to fit and ride on the circular flange 8 of the associated side plate, whenever the above-described height adjustment of the cutter 16 is made, thus maintaining at all times the oil-tight inclosure of the gearing which drives said cutter 16.

The above-described forwardly-positioned auxiliary cutting apparatus, although built into the mower and operated from the latter's internal driving gear 7, can nevertheless be removed as a unit from the mower, in the event that the condition of the lawn to be cut is such as to require only the conventional shearing action of the reel A and the cutter bar B, that is a lawn devoid of any high grass or weeds, etc., having tough wiry stems. Under these conditions, if the operator desires to use the mower without expending the energy needed to rotate the cutting device 16, the latter can be readily removed from the mower assembly. To this end, as best shown in Fig. 5, the forward or shaft-journalling part 40 of each housing 36 is made in halves, so as to be parted on a substantially horizontal diameter thereof, the upper half 51 being a separate piece and the lower half being integral with the housing; the upper half 51 is secured in place to inclose the shaft 31 and its bearings 43 by means of suitable screws or bolts 52, 52; when these screws or bolts are removed from the two housings 36, 36, allowing the two cap portions 51, 51 to be lifted off, the rotary cutter or reel 16, together with its shaft 31, bearings 43, 43 and pinions 41, 41, can be lifted out bodily from the housings 36, 36, after which the cap portions 51, 51 can be replaced so as to exclude dust and dirt from said housings when the apparatus is being operated as a conventional lawn mower in the absence of the forward cutter 16.

Or, if desired, the entire forward cutting mechanism, including the housings 36, 36 and the driving gears for the shaft 31, can be taken off the mower, so that the operator's burden is still further reduced by his not being required to effect, in the conventional use of the mower, the idle rotation of the stub shafts 33, 33 and their associated gears and pinions. It is only necessary for this purpose to take off the nuts 38 and 48 and, after removing the cutter 16 in the manner above described, to lift each housing 36, 36 inwardly off its associated stud 3 and bolt 47, thus withdrawing through each opening 32 the pinion 34, so that only the pinion 26 of the primary reel A is left in mesh with the internal gear 7. With the housings 36, 36 and their inclosed gears thus removed, the openings 32, 32 are preferably covered with suitably shaped plates 53 attachable to the bolts 47, 47 and serving for the exclusion of dust and dirt and for the retention of lubricant, and in this condition the mower is operable, like any conventional shear-cut lawn mower, for the satisfactory mowing of a lawn if same is devoid of coarse tough, unshearable growths. The scythe-cut apparatus, including the housings 36, 36 and the driving gearing for the shaft 31, can be quickly and readily attached and adjusted, in the manner above described, whenever it is desired to have the mower operate on a lawn that contains any tough unshearable growths. It will be apparent that inasmuch as the blades of the cutter 16 are not required to wipe across or to frictionally engage any cutter or ledger bar, the rotation of such cutter for scything off the tough unshearable growths can be obtained by the expenditure of only a negligible amount of power over and above the power required to push the mower forwardly and to rotate the wiping or shearing cutter A; in other words, by our invention, without materially increasing the weight of the conventional mower assembly, or materially increasing the power required to push or operate the mower, we obtain in the most efficient manner the cutting off of all the tough upstanding unshearable growths that infest the average lawn, in consequence of which any lawn, no matter how badly infested with such growths, after passage thereover by our improved mower, is invariably transformed into a sightly and uniformly cut lawn.

We claim:

1. In a lawn mower, the combination with rotary cutting devices, of a traction wheel providing an internal gear for the drive of said cutting devices, a side plate associated with and rotatively supporting said traction wheel, a lateral annular flange projecting from said side plate and overhanging and inclosing said internal gear, to provide a running joint between wheel and side plate on the opposite side of the latter from said cutting devices, and a packing between wheel and flange, carried by said flange within the space inclosed thereby, to prevent escape of lubricant therefrom and access of dust or dirt thereto.

2. In a lawn mower, having the usual grass-shearing mechanism, viz., a cutter bar and cooperating rotary reel, the latter having a driving pinion in mesh with an internal gear provided by a traction wheel of the mower, the combination with a second rotatably-mounted cutting device for said mower, of a driving pinion thereon, and an idler gear connection between said internal gear and the last-mentioned driving pinion, whereby to rotate said second cutting device in a direction opposite to the rotation of the reel of said grass-shearing mechanism, in the forward propulsion of the mower.

3. In a lawn mower, having the usual grass-shearing mechanism, viz., a cutter bar and cooperating rotary reel, the latter having a driving pinion in mesh with an internal gear provided by a traction wheel of the mower, the combination with a second rotatably-mounted cutting device for said mower, driving means for said second cutting device including an idler gear meshing with said internal gear and transmitting the latter's rotation to said second cutting device, in a direction opposite to the rotation of the reel of said grass-shearing mechanism, and means for vertically adjusting said second cutting device and its driving means about an axis corresponding to that of said internal gear.

FRANK T. FARMER.
STANLEY D. LOUD.